US010282091B2

(12) United States Patent
Mahajan et al.

(10) Patent No.: US 10,282,091 B2
(45) Date of Patent: May 7, 2019

(54) BI-STABLE DISPLAY BASED OFF-SCREEN KEYBOARD

(71) Applicant: INTEL CORPORATION, Santa Clara, CA (US)

(72) Inventors: Ayeshwarya Mahajan, Bangalore (IN); Ramesh Pendakur, Gaston, OR (US); Sean Lawrence, Bangalore (IN); Ankita Tapaswi, Pune (IN); Rajib Mahapatra, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/385,552

(22) Filed: Dec. 20, 2016

(65) Prior Publication Data

US 2017/0097766 A1   Apr. 6, 2017

Related U.S. Application Data

(63) Continuation of application No. 14/498,913, filed on Sep. 26, 2014.

(30) Foreign Application Priority Data

Sep. 27, 2013  (IN) ........................... 4380/CHE/2013

(51) Int. Cl.
*G06F 3/0488* (2013.01)
*G06F 3/023* (2006.01)
*G09G 3/38* (2006.01)

(52) U.S. Cl.
CPC .......... *G06F 3/04886* (2013.01); *G06F 3/023* (2013.01); *G06F 3/0238* (2013.01); *G09G 3/38* (2013.01)

(58) Field of Classification Search
CPC .... G06F 3/04886; G06F 3/0238; G06F 3/023; G06F 3/0412; G09G 3/38; G09G 3/04–3/19
USPC ......................................................... 345/168
See application file for complete search history.

(56) References Cited

U.S. PATENT DOCUMENTS

| | | | | |
|---|---|---|---|---|
| 6,340,820 | B1 * | 1/2002 | Youden | G01J 1/58 250/483.1 |
| 2005/0140665 | A1 * | 6/2005 | Faris | G06F 3/0412 345/206 |
| 2008/0204418 | A1 * | 8/2008 | Cybart | G06F 1/1626 345/173 |
| 2008/0258940 | A1 * | 10/2008 | Ding | G06F 21/31 341/22 |
| 2009/0066655 | A1 * | 3/2009 | Kim | H01H 13/83 345/169 |
| 2011/0134097 | A1 * | 6/2011 | Sugamata | G06F 1/3203 345/211 |
| 2011/0310459 | A1 * | 12/2011 | Gates | G06F 3/0412 359/296 |
| 2012/0092259 | A1 * | 4/2012 | Liu | G06F 3/0233 345/168 |

(Continued)

*Primary Examiner* — Chineyere D Wills-Burns
(74) *Attorney, Agent, or Firm* — International IP Law Group, P.L.L.C.

(57) ABSTRACT

A display based keyboard is described herein. The display based keyboard includes a bi-stable segmented-based display, a master controller, and a display driver. The bi-stable segmented-based display may include a front barrier layer, a top plane layer, a display technology specific layer, a back plane layer, and a rear barrier layer.

67 Claims, 16 Drawing Sheets

(56) References Cited

U.S. PATENT DOCUMENTS

| | | | |
|---|---|---|---|
| 2012/0235912 A1* | 9/2012 | Laubach | G06F 3/04895 345/163 |
| 2013/0228433 A1* | 9/2013 | Shaw | G06F 1/1618 200/5 A |
| 2013/0241909 A1 | 9/2013 | Al-Dahle | |
| 2014/0028564 A1* | 1/2014 | Valentine | G06F 1/1662 345/168 |
| 2014/0168131 A1* | 6/2014 | Rihn | G06F 3/044 345/174 |
| 2014/0215201 A1* | 7/2014 | Pfeifer | G06F 9/441 713/100 |

* cited by examiner

200

300

300

300

300

300

400

500

600

700

700

800

900

1100

1100

BI-STABLE DISPLAY BASED OFF-SCREEN KEYBOARD

CROSS REFERENCE TO RELATED APPLICATIONS

This application is a continuation of U.S. patent application Ser. No. 14/498,913, filed Sep. 26, 2014, which claims the benefit of the filing date of an India Provisional Application No. 4380/CHE/2013, filed on Sep. 27, 2013, the contents of which are hereby incorporated by reference.

TECHNICAL FIELD

The present disclosure generally relates to a display based keyboard. In particular, the present techniques include a bi-stable display off-screen keyboard, where the display may be a customized segmented display.

BACKGROUND ART

Today, a variety of keyboards are used in the personal computing (PC) space, including a desktop, an all-in-one laptop, an ultrabook, a tablet, a phone, and among other similar electronic devices, that may include on-screen keyboards and off-screen keyboards. FIG. 1 is an illustration of a conventional PC device 100 including a passive off-screen keyboard 102 and a contextual on-screen keyboard 104. Some of the known limitations of the off-screen keyboard 102 may include low visibility of key caps at particular views, high-power requirements, lack of tactile feedback, and non-ergonomic concerns.

Although new human computer interactions and increased sensor capabilities have been introduced, the off-screen keyboard 102 has not evolved to include interactive context and programmable methods. Moreover, the relevance and use of a compute form factor for an end-user may be increasingly driven by applications that leverage active and programmable interfaces. However, the off-screen keyboard 102 has not taken advantage of such applications and remains passive with a fixed function (i.e., non-programmable) interface.

The form factor of a device is a function of both technology and the envisioned context of the use of the device. The context of the use may extend to the tasks an end-user desires to perform, the physical environment and location of the device, and other devices that can populate the surrounding ecosystem. However, form factor limitations associated with the functionality of conventional keyboards is a usage barrier to a PC end-user. For example, the off-screen keyboard 102 may present an inconsistent user experience due to the various sizes in the space available for the keyboard layout. In particular, variations may exist in the number, placement, and pitch of the keys.

DESCRIPTION OF THE EMBODIMENTS

The present disclosure is related to a device that overcomes challenges associated with conventional off-screen keyboards. The present techniques may combine human computer interactions and sensor capabilities to the conventional off-screen keyboard. In some embodiments, a bi-stable type display for an off-screen keyboard may include a bi-stable segmented display with active and programmable interfaces. As a result, the bi-stable display based off screen keyboard can leverage active and programmable ingredients of the platform.

Figure 1:
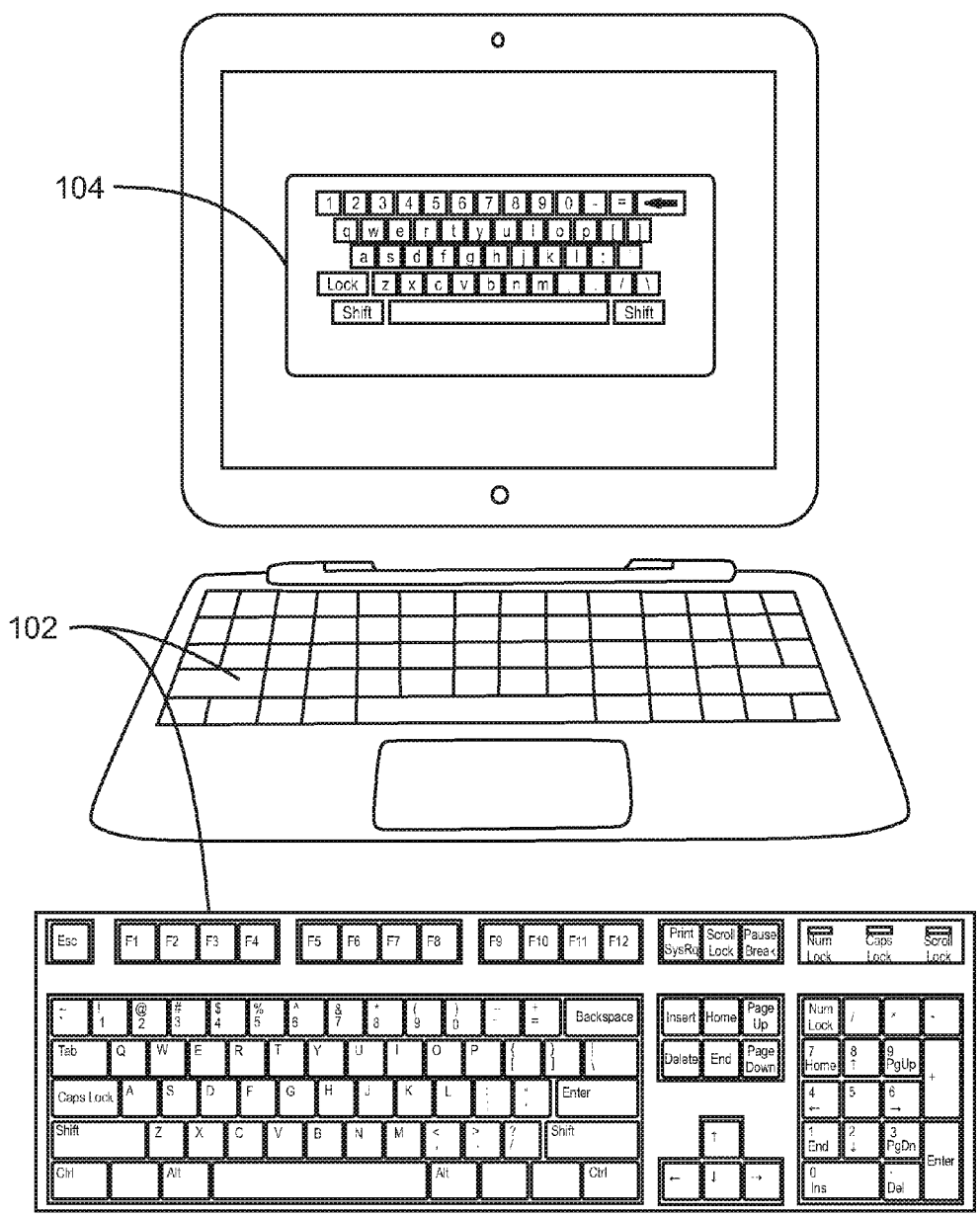
FIG. 1 is an illustration of a conventional PC device including an off-screen keyboard and an on-screen keyboard.
Figure 2:
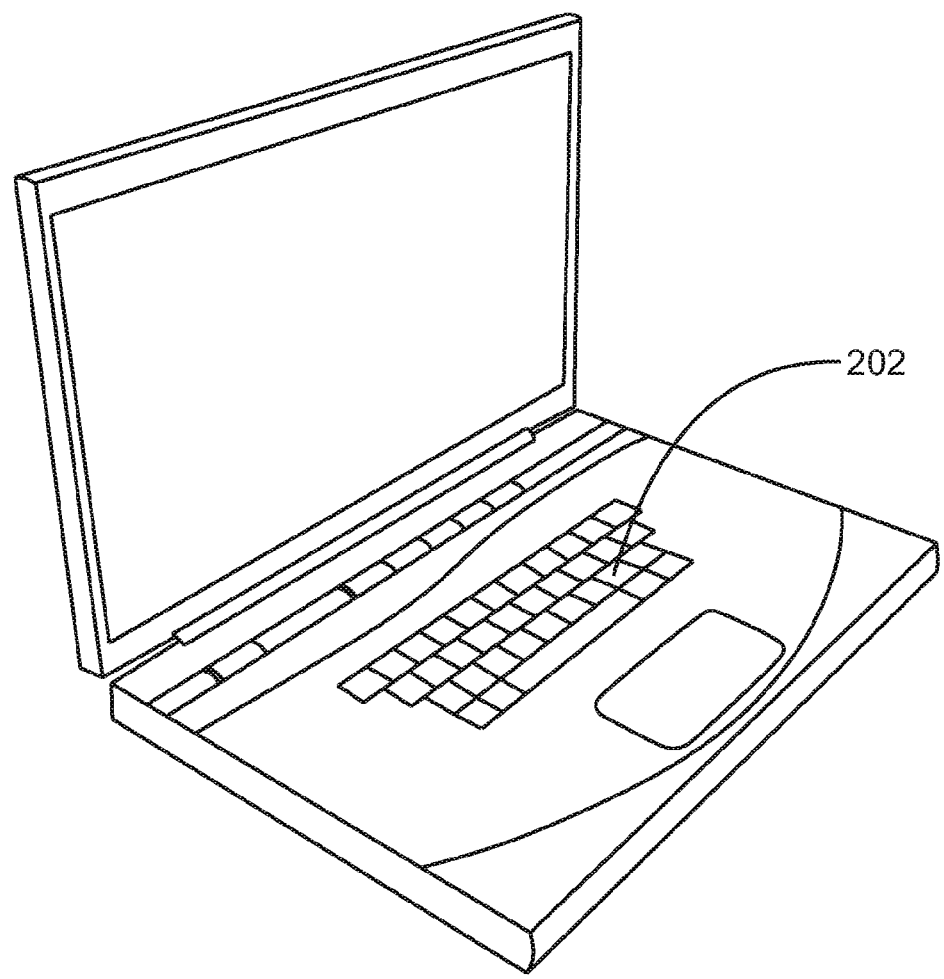
FIG. 2 is an illustration of a PC integrated with a bi-stable segmented display based keyboard.

FIG. 2 is an illustration of a PC integrated with a bi-stable segmented display based keyboard 202. There can be many advantages to utilizing the bi-stable segmented display keyboard 202 as compared to the conventional keyboard associated with the PC. The bi-stable segmented display keyboard 202 may include a lower power consumption, as compared to conventional off-screen keyboards. For example, the display may consume up to 12 microwatts per square centimeter ($\mu W/cm^2$) during an image change, and up to 480 $\mu W/cm^2$ in a worst-case scenario during an entire key update. Otherwise, the display may consume zero power consumption when the content of the keyboard is static. In this manner, the keyboard is a low power keyboard.

The bi-stable segmented display based keyboard 202 may contain a low-pin count display interface to enable a thinner and lighter keyboard design. Additionally, the configuration of the keyboard 202 may contain fewer keys than conventional keyboards and may not require a dedicated display controller. Accordingly, the keyboard 202 can take up less space when compared to a similar conventional keyboard, while retaining ergonomic comfort, i.e., a 19-21 mm pitch, that may be consistent across different size of form factors and modes of use. Concerning the viewing experience of an end-user, the bi-stable segmented display based keyboard 202 may provide a non-pixelated visual display with a viewing angle that is similar to current non-display based keyboards. Moreover, a display encapsulation method may be implemented wherein the keycap structure can function as a front and back barrier to facilitate an integrated barrier for display. In some cases, the bi-stable display is based on electrophoretic or electro-chromic or photonic display technologies.

The bi-stable segmented display technology is a non-traditional display method in that it requires power only to change an image on a display but does not require any power to hold the image in place indefinitely. Thus, the image may be retained on the display even after the panel power supply has been removed. The advantages of the bi-stable segmented display technology includes paper-like readability, with features such as high contrast and wide viewing angles.

One type of bi-stable display includes a segmented based display. The segmented based display is intended for applications where the display requirements can be met using predefined segments that can be turned on or off. This type of technology may be similar to the display of a typical calculator with a numeric or an alphanumeric display.

Figure 3A:
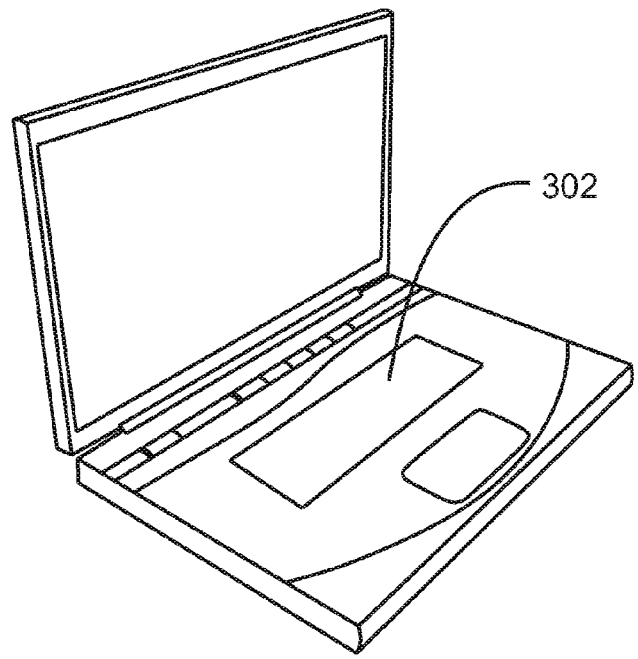
FIGS. 3A-3E each illustrate variations of a bi-stable segmented display based keyboard.
Figure 3B:
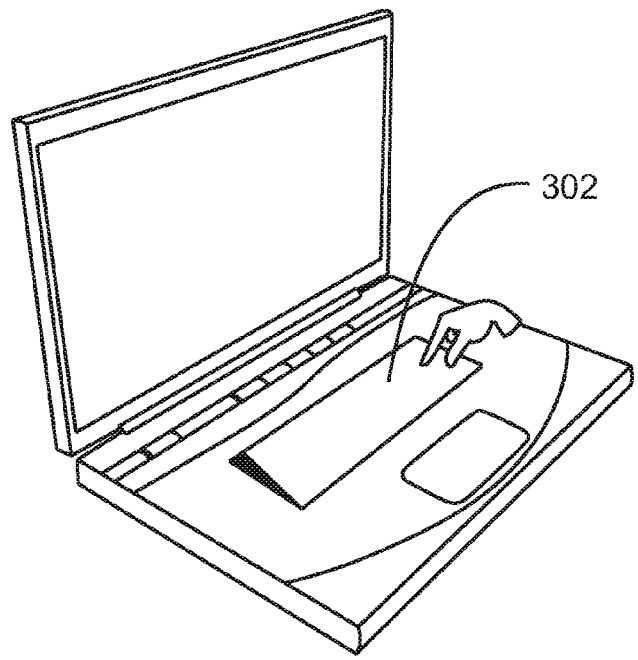
Figure 3C:
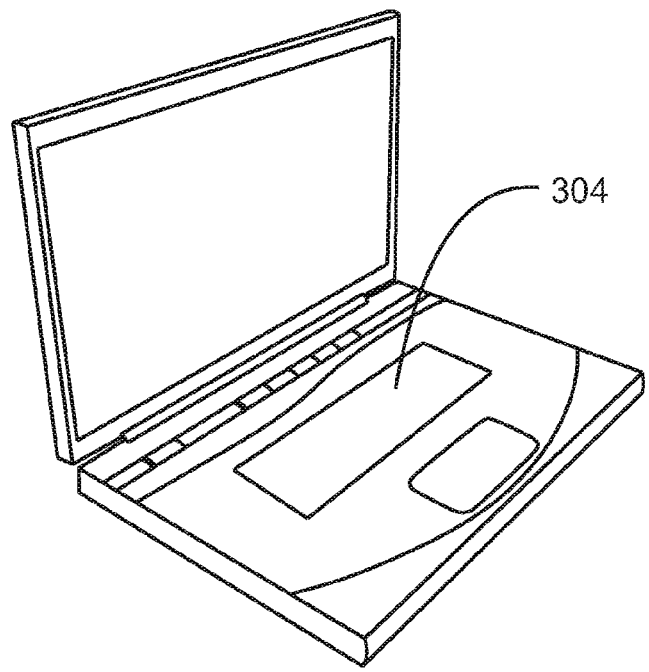

FIGS. 3A-3E each illustrate variations of a display based keyboard. In embodiments, the display based keyboard may be a bi-stable, segmented display based keyboard. As shown in FIG. 3A, a display keyboard 302 may be constructed using a segmented display integrated within the PC device. The entire keyboard area may be replaced with a single display. In some cases, the single display is non-tactile. Additionally, the keyboard 302 may include a push lock mechanism to enable a fixed wedge display. In other words, the keyboard 302 is located on a wedge. As shown in FIG. 3B, the keyboard 302 can be elevated with the touch of a finger. For example, in a fixed wedge display mode, the wedge includes the display keyboard 302 and may be raised in a lifted-position so as to be tilted at a specified angle. The keyboard 302 can be lowered to lay flat within the PC device surface by engaging the push lock mechanism to enable a non-fixed wedge display, as shown in FIG. 3A. FIG. 3C illustrates a display based keyboard 304. The display based keyboard 304 does not include a push lock mechanism to enable or disable a fixed wedge display. As a result, the keyboard 304 maintains a flushed position within the PC device surface.

Figure 3D:
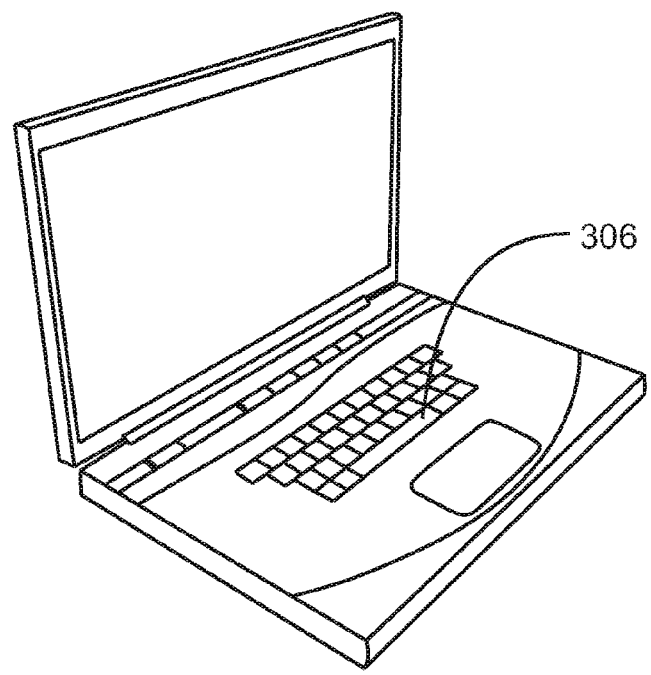
Figure 3E:
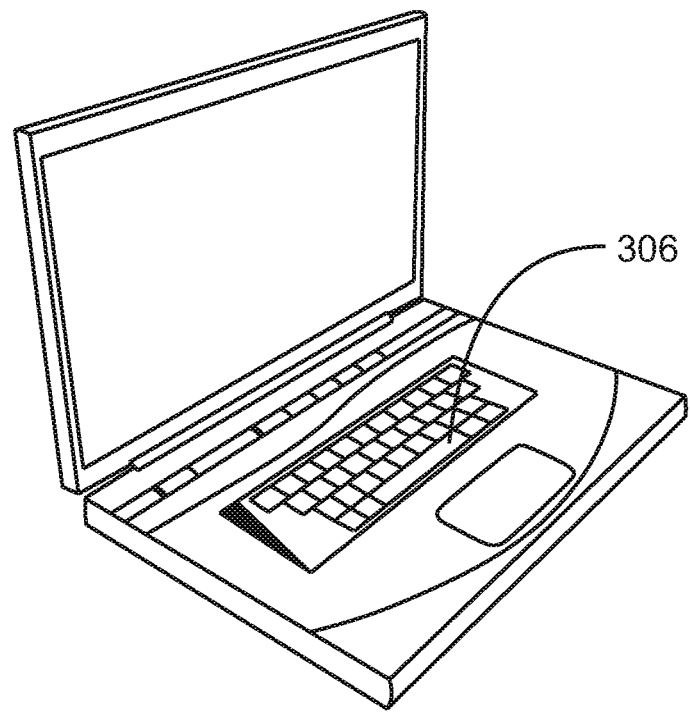

FIG. 3D illustrates a bi-stable segmented display based keyboard 306. As shown in FIG. 3D, the bi-stable segmented keyboard 306 may be constructed using multiple small size segmented displays where key has a dedicated display. Similar to FIG. 3B, the bi-stable segmented keyboard 306 can be elevated with the touch of a finger, as shown in FIG. 3E. With respect to FIGS. 3A-3E, the keyboards 302, 304, 306 may be non-tactile in nature where a depression of the keys does not include tactile feedback, e.g., clicking sound or the bump, or tactile in nature. The keyboards 302, 304, 306 may also be tactile. Moreover, although five variations of a display based keyboard are illustrated, various features as described herein can be combined to create a bi-stable segmented display based keyboard. For example, a portion of the display based keyboard can be tactile or non-tactile. Moreover, a portion of the display based keyboard can be segmented.

Further, although a laptop form factor is illustrated, the present techniques can be used with any keyboard. As illustrated, laptop keyboards may include a pop-up tilt display based keyboard, that the tilt may be adjusted to any angle.

Figure 4:
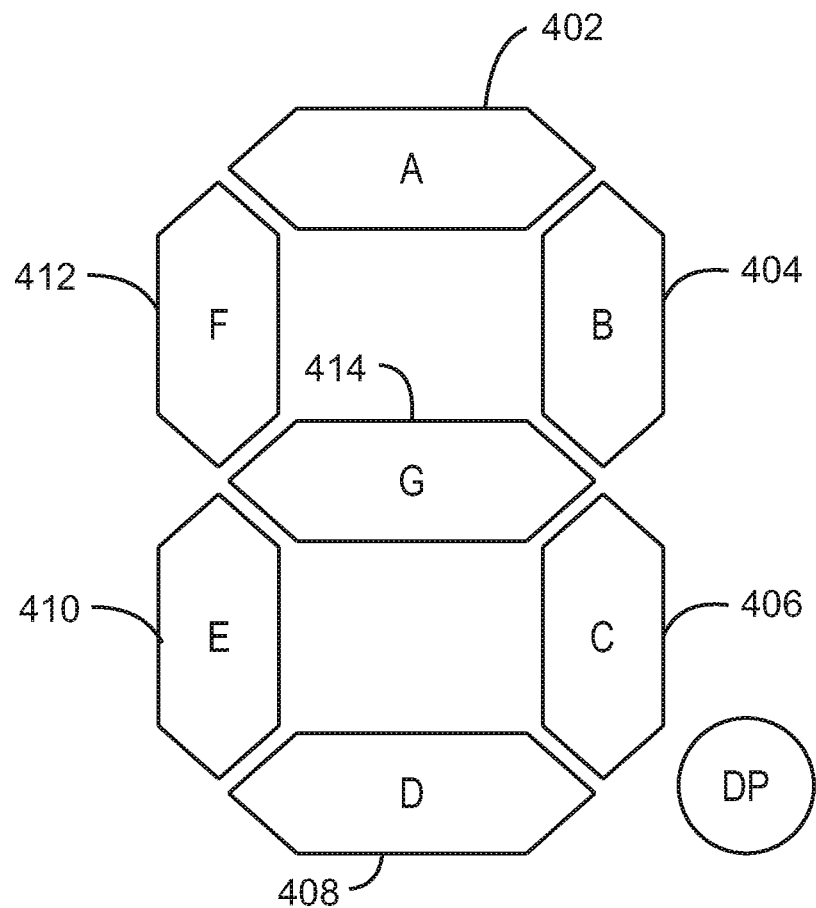
FIG. 4 is an illustration of seven (7) segments for a bi-stable segmented based display.

FIG. 4 is an illustration of seven (7) segments for a bi-stable segmented based display 400. In a segmented based display 400, all possible images may be preconfigured. The pre-configuration of the segmented based display 400 may be achieved by dividing the material of the display area into multiple unique regions. As described herein, a segment is a unique region. As shown in FIG. 4, seven segments A-G, 402, 404, 406, 408, 410, 412, 414 are created. Accordingly, different desired images can be constructed thereafter by driving some or all of the segments. In some embodiments, the segmented based display 400 may be built using reflective display technologies such as electrophoretic (EInk) display, electo-chromic display, photonic display, and the like.

Figure 5:
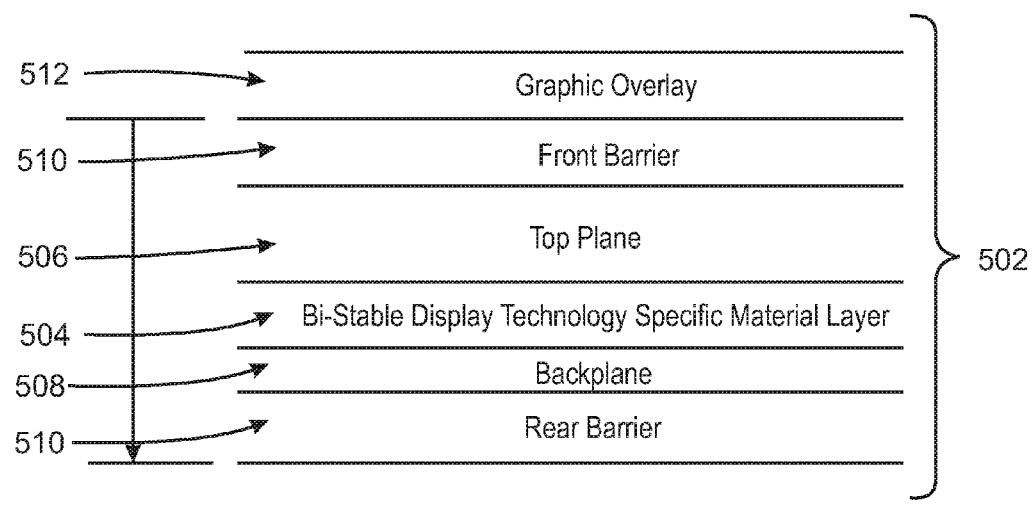
FIG. 5 is an illustration of a layered structure for a bi-stable segmented based display.

FIG. 5 is an illustration of a layered structure for a bi-stable segment based display 500. The segmented based display 500 may include a layered structure 502 that is enclosed in an enclosure. As shown in FIG. 5, a display technology specific layer 504 may be sandwiched between two electrode layers, a top plane 506, and a back-plane 508. The display technology specific layer 504, along with the top plane and the back-plane 508, may then be encased in an environmental barrier solution 510, including a front barrier and a rear barrier, to protect the bi-stable display material 504 and the electrodes 506, 508. Further, the process of enclosing the top plane 506 and the back-plane 508 between the barrier solution 510, may be combined with the process of key-cap injection molding. The enclosed key-cap may act as an enclosure barrier to reduce assembly costs and enable the display 500 to appear as if it is on the surface of the PC space for an improved visual experience. In some embodiments, the back-plane 508 may be manufactured using either printed carbon (PET) or polyimide. In some embodiments, a graphic overlay layer 512 containing colored printed graphics may be included. The graphic overlay layer 512 may contain thin borders to hide any ghosting effect of the bi-stable display, and thus, may add more visual colors to the bi-stable display.

Figure 6:
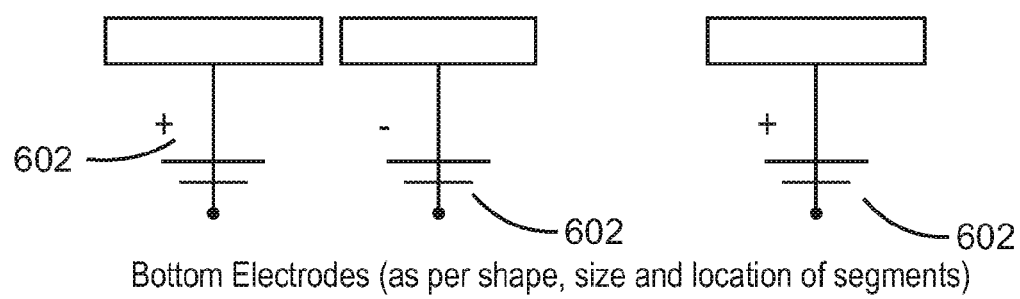
FIG. 6 is an illustration of multiple electrodes of a bi-stable segmented based display routed on a back plane.

FIG. 6 is an illustration of a multiple electrodes of a bi-stable segmented display 600 routed on a back plane. Each segment, as previously shown in FIG. 4, may have an individual electrode 602 on its back plane with the same shape or size as the segment. In operation, multiple electrodes 602 may be routed on a back plane of the segmented display, thereby, forming a display connector or a tail-off the edge of the display. The tail of the electrode 602 may include one trace for each segment plus two additional traces for the top plane and the back plane connection. In some instances, the property of the segmented display material may change if there is a difference in voltages between the back plane (unique per segment) and the top plane (common for all segments). The change in voltage may also drive an individual segment into an activation mode or a deactivation mode.

Figure 7A:
FIGS. 7A and 7B each illustrate generic images shown by a display and a bi-stable segmented display using the generic images to generate the display.
Figure 7B:
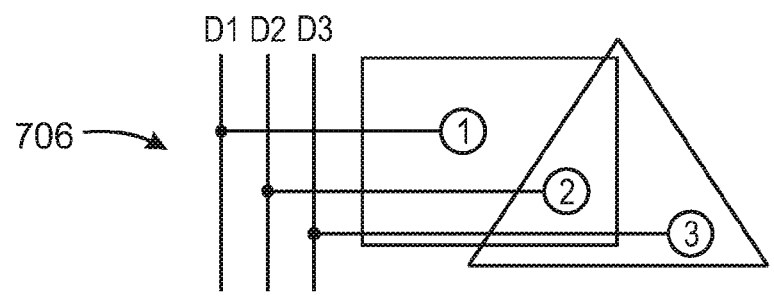

FIGS. 7A and 7B each illustrate generic images 700 shown by a display and a bi-stable segmented display using the generic images to generate the display. As shown in FIG. 7A, generic images 702, 704 may be used to generate a customized segmented display. The generated customized bi-stable segmented display 706, as shown in FIG. 7B, may include the generic images and several segments, including segments 1, 2, and 3. The segments may be common to more than one image and may each require a dedicated drive line. As illustrated in FIG. 7B, the dedicated drive lines may include dedicated lines D1, D2, and D3. In operation, to display the generic image 702, segments 1 and 2 may be activated and segment 3 may be deactivated. Moreover, to display the generic image 704, segments 2 and 3 may be activated and segment 1 may be deactivated. As the number of unique images that need to be packaged in a display increases, the number of common segments increases. As a result, the number of drive lines and connector material related-cost may increase and the overall system may have more wires and connections, which can impact the form factor thickness. The situation may be exaggerated when creating very small size segmented displays (e.g. 15 mm×15 mm) since the overall display system may increase significantly with an increase in the number of unique images that can be shown on the display.

In embodiments, the segmented bi-stable display may provide key glyphs on the keyboard. A glyph may be used in a visual representation of characters to form a character looks. In some cases a character may corresponds to a single glyph. However, one character may correspond to several glyphs or several characters to one glyph.

Figure 8:
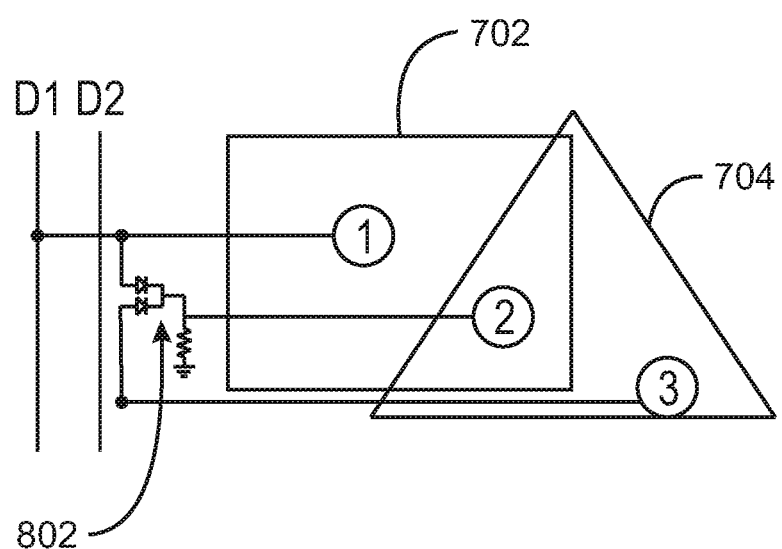
FIG. 8 is an illustration of a segmented based display with a plurality of segments connected via a pair of diodes.

FIG. 8 is an illustration of a segmented based display 800 with a plurality of segments connected via a pair of diodes 802. Like numbers will be described with respect to FIGS. 7A, 7B. A diode may provide an asymmetric conductance. Thus, the pair of diodes 802 may be used to connect common segments with image unique segments. Although similar to FIG. 7B, as the generic images 702, 704 may initially overlap, the pair of diodes 802 may remove the requirement of dedicated drive lines for the common segments. As previously discussed, a plurality of segments may be independent of each other whereby all images can be later constructed by driving some or all of the segments.

The segmented based display 800 may take advantage of the fact that human eyes cannot visually perceive small physical gaps, i.e., gaps measuring about 200 μm. Such small gaps can be utilized for printing diodes while creating electrodes in the back plane to eventually reduce the number of dedicated drive lines required for display. As a result, a low-cost bi-stable segmented display with less interface pins may be created. Additionally, the segments may be connected together to reduce the number of unique drive lines required to drive the display 800. Thereafter, the segments that are common to multiple images with the diode pair 802 may be interconnected.

Figure 9:
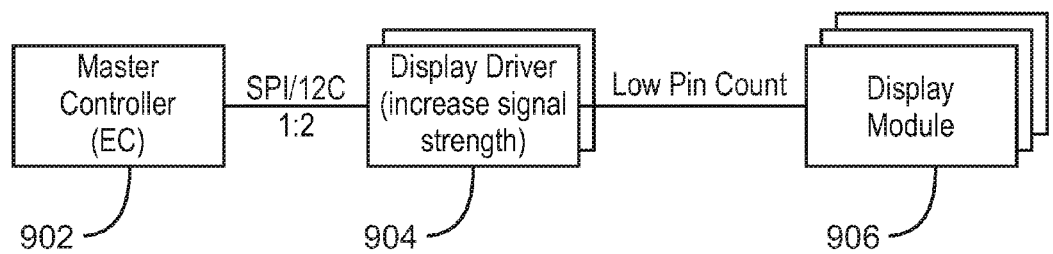
FIG. 9 is an illustration of a control system for a bi-stable segmented display based keyboard.

FIG. 9 is an illustration of a control system 900 for a bi-stable segmented display keyboard. As previously stated, by implementing a customized segmented display and by optimizing the position of the graphics in each key cap, a bi-stable segmented display keyboard may include a low pin interface, thus, alleviating the use of a display controller. Instead of a display controller, the display may be directly controlled by a keyboard master controller 902. As shown in FIG. 9, the control system 900 may include several display drivers 904 to provide increase signal strength and low pin interface to a display module 906, e.g., the bi-stable segmented based display.

Figure 10:
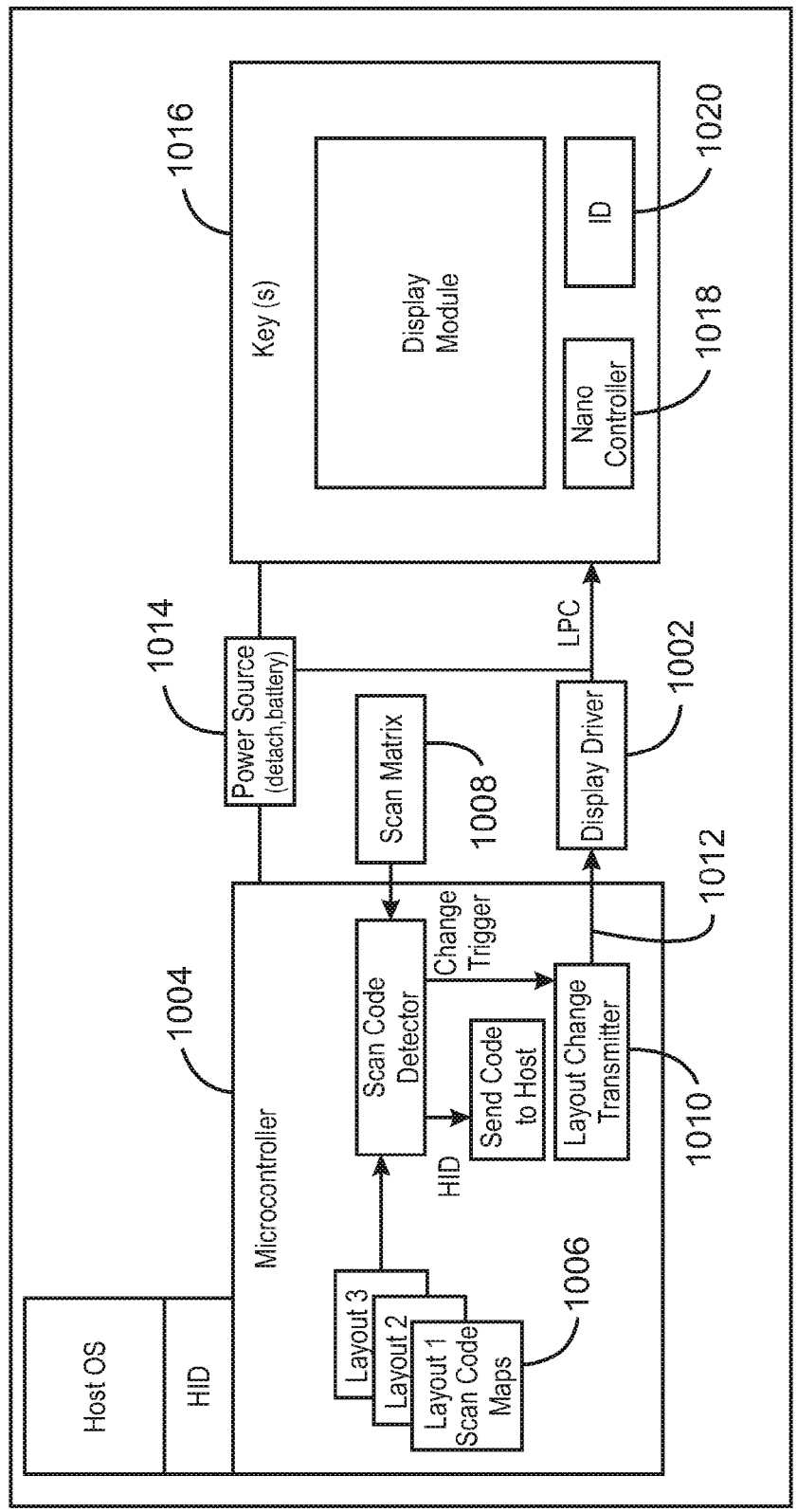
FIG. 10 is an illustration of a system level block diagram for a bi-stable segmented based display.

FIG. 10 is an illustration of a system level block diagram for a bi-stable segmented display based keyboard 1000. In a multi-display tactile embodiment, all display integrated key caps may be affixed on existing mechanical designs. Since the display based keyboard 1000 may have a low pin interface, the keyboard 1000 can be connected to a display driver 1002 in a base printed circuit board using a low pin flex connector, which can co-exists with conventional scissor or other switch designs. In some embodiments, based on the low display power requirement of the display based keyboard 1000, capacitive coupling may be another proposed method for connection.

The embedded controller card (EC) firmware 1004, as shown in FIG. 10, maintains multiple keyboard scan code maps 1006 for individual keyboard layouts. During start-up of a system, a default table corresponding to lower case alphabet layout may be assigned by the EC 1004. When a key is pressed, the input may be detected using a conventional scan matrix 1008. If the input corresponds to an event where the keyboard layout should be changed, then the active scan code map 1006 may be changed and the event is notified to change a layout transmitter module 1010 of the EC 1004. This module 1010 drives display segments that may require updating via a SPI/I2C interface 1012 to the display driver 1002. In a single display non-tactile embodiment, the display subsystem functions in the same way as the multi-display, non-tactile embodiment. However, within the single display, the input is detected either through scan matrix integrated in the display layer or via a coarse resistive or a capacitive grid.

In some embodiments, a keyboard system integrated in the PC form factor may be detached at runtime from the rest of the system. Thus, the display based keyboard 1000 may include an additional power source, i.e., a battery 1014, that uses conventional Bluetooth or similar human interface devices (HID) stack to communicate with the rest of the keyboard 1000. In some embodiments, for multi-display variant, each key 1016 has a nano-controller 1018, e.g. an active printed circuit, and a flashed identification (ID) 1020, e.g. data in a printed memory. If the key 1016 receives power from a base, the nano-controller 1018 may use the value present in the flashed ID 1020 to make itself discoverable to the rest of the display based keyboard 1000. Based on the discovery, the EC 1004 can update the scan code or take any other action. This may allow physical modifications of the key caps and keyboard layout and automatic updates of the EC firmware.

Figure 11A:
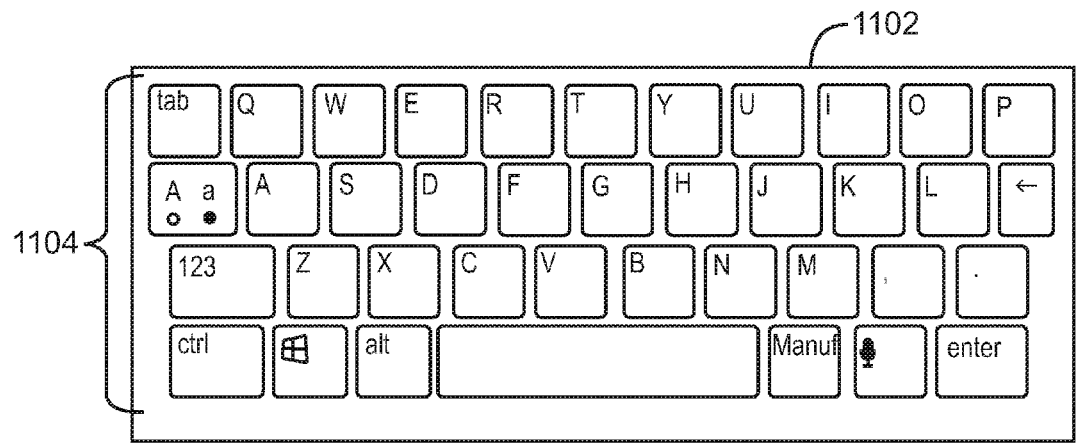
FIGS. 11A-11C each illustrate various layouts for a bi-stable segmented display based keyboard.
Figure 11B:
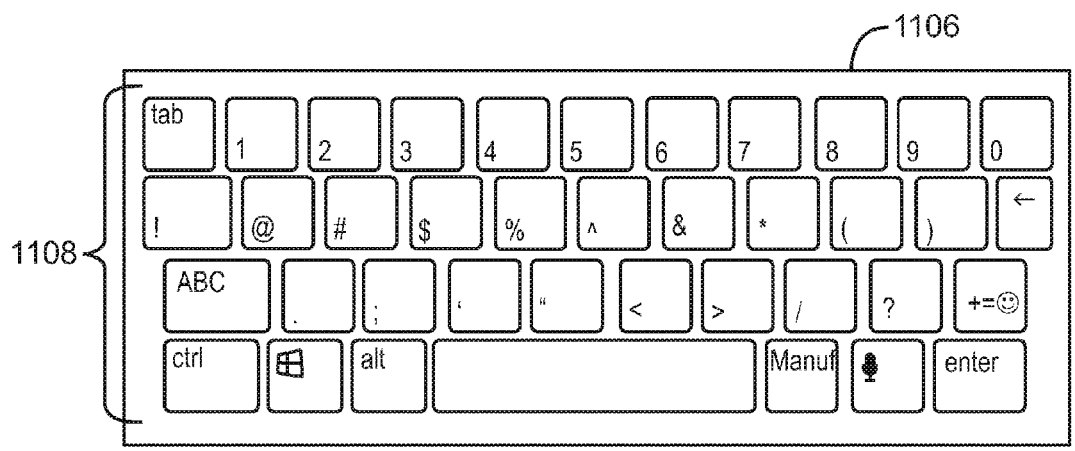
Figure 11C:
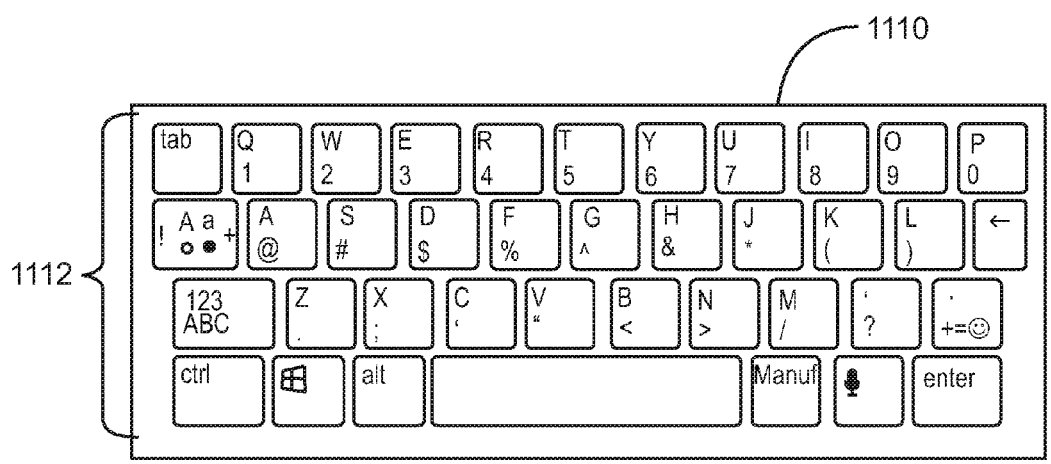

FIGS. 11A-11C each illustrate various layout for a bi-stable segmented display based keyboard. As shown in FIG. 11A, the keyboard 1102 may include a display on start-up of a PC device. The display may be similar to that of a cellular phone since it may have a lower number of keys (e.g. 39). As shown in FIG. 11A, keys 1104 of the keyboard 1102 may include an option to switch between Windows/Android technologies, a voice activation option, a custom indicator for caps lock on or off option, a key to switch between a numbers layout and a symbols layout option, and a manufacturer option for context sensitive triggers, among others options. A keyboard 1106 that includes a switch to a key number layout 1108 can be seen in FIG. 11B. As illustrated in FIG. 11C, for the customized segmented display based keyboard 1110, which may be a single display based keyboard non-tactile or multiple display based tactile keyboard, the content for the keyboard layout 1112 may be pre-defined.

Figure 12:
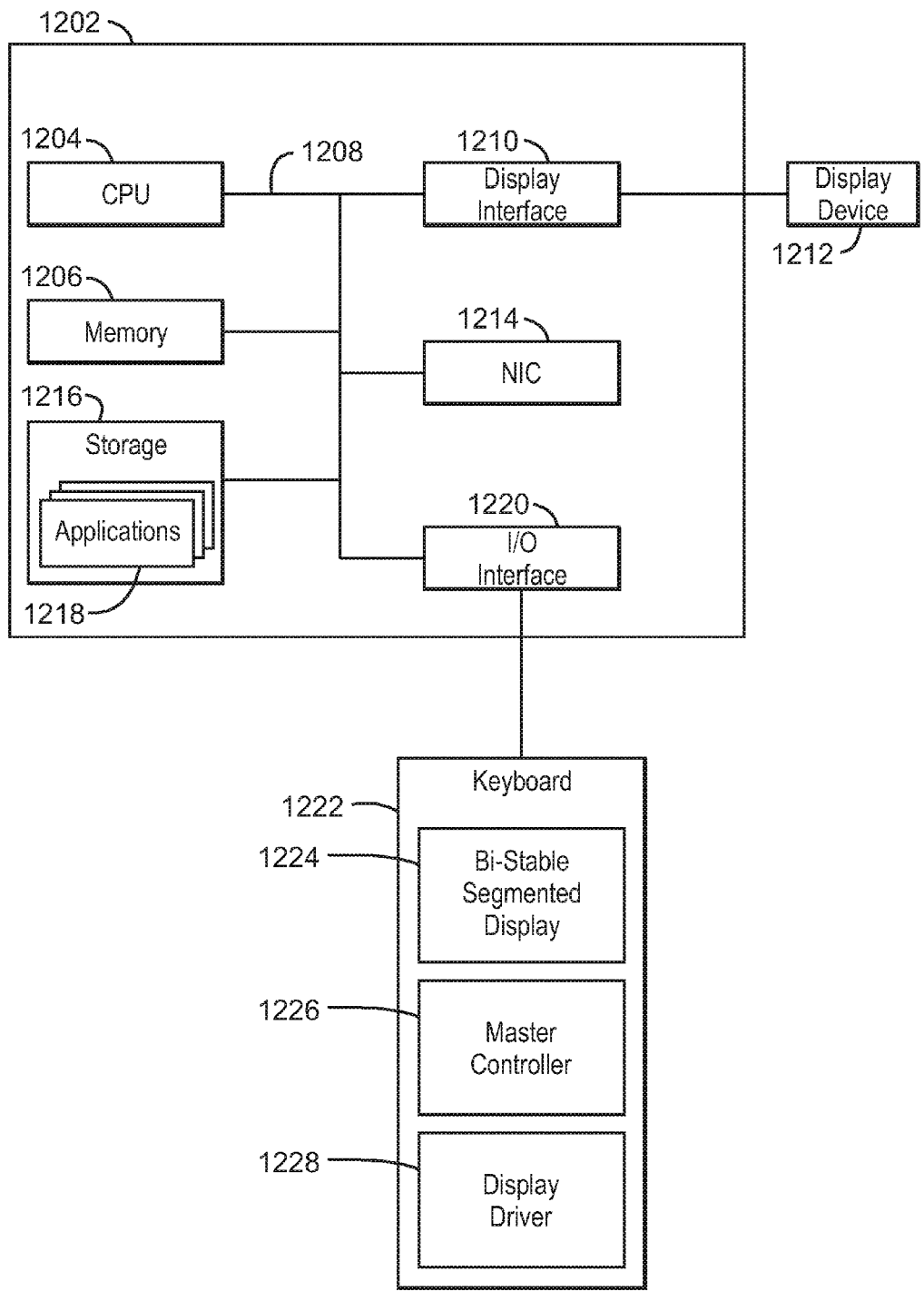
FIG. 12 is a block diagram of a computing system including a bi-stable segmented display based keyboard.

FIG. 12 is a block diagram of a computing system 1200 including a bi-stable segmented display based keyboard. The computing system 1200 can include a host electronic device 1202. The host electronic device 102 can be any suitable type of computing system including, for example and without limitation, tablet computer, laptop computer, an ultra-book computer, a cellular phone, such as a smartphone, and the like. The host electronic device 1202 can include a central processing unit (CPU) 1204 to execute stored instructions, as well as a memory device 1206 that stores instructions that are executable by the CPU 1204. The CPU 1204 can be coupled to the memory device 1206 by a bus 1208. Additionally, the CPU 1204 can be a single core processor, a multi-core processor, or any number of other configurations. Furthermore, the host electronic device 1202 can include more than one CPU 1204.

The memory device 1206 can include random access memory (RAM), read only memory (ROM), flash memory, or any other suitable memory systems. For example, the memory device 1206 can include dynamic random access memory (DRAM). The CPU 1204 can be linked through the bus 1208 to a display interface 1210 to connect the host electronic device 1202 to a display device 1212. The display device 1212 can include a display screen that is a built-in component of the host electronic device 1202. The display device 1212 can also include a computer monitor, television, or projector, among others, that is externally connected to the host electronic device 1202.

A network interface card (NIC) 1214 can connect the host electronic device 1202 through the system bus 1208 to a network (not depicted). The network (not depicted) can be a wide area network (WAN), local area network (LAN), or the Internet, among others. In an example, the host electronic device 1202 can connect to a network via a wired connection or a wireless connection.

The host electronic device 1202 also includes a storage device 1216. The storage device 1216 is a physical memory such as a hard drive, an optical drive, a thumbdrive, a secure digital (SD) card, a microSD card, an array of drives, or any combinations thereof, among others. The storage device 1216 can also include remote storage drives. The storage device 1216 includes any number of applications 1218, for example, an application related to a bi-stable segmented based display, that are configured to run on the host electronic device 1202.

The CPU 1204 can also be connected through the bus 1208 to an input/output (I/O) device interface 1220 configured to connect the host electronic device 1202 to one or more I/O devices, including a bi-stable keyboard 1222. The I/O device interface 1220 can scale across a wide range of data rates to accommodate an I/O device including a current new form factor (NFF) connector, as well as a device including a legacy connector.

The bi-stable keyboard 1222 may include a bi-stable segmented based display 1224, a master controller 1226, and a display driver 1228. The technology of the bi-stable segmented based display 1224 may be based on electrophoretic, electro-chromic, or photonic display technologies. Additionally, the bi-stable segmented based display 1224 may be a single or a multiple bi-stable segmented based display with a low-pin count display interface. With a multiple bi-stable segmented based display 1224, the master controller 1226 may maintain multiple keyboard scan code maps for various individual keyboard layouts in order to control the bi-stable segmented based display 1224. In some embodiments, the bi-stable segmented based display 1224 may be connected to the display driver 1228 using a flex connector (not shown). The bi-stable segmented based display 1224 may include a number of keys, i.e., less than 40 keys, that are either non-tactile or tackle in nature.

Other types of I/O devices may be connected to the host electronic device 1202, for example, a pointing device may be connected as a touchpad or a touchscreen, among others. The I/O devices, including bi-stable keyboard 1222, can be built-in components of the host electronic device 1202, or can be devices that are externally connected to the host electronic device 1202.

It is to be understood the block diagram of FIG. 12 is not intended to indicate that the computing system 1200 is to include all of the components shown in FIG. 12 in every case. Further, any number of additional components can be included within the computing system 1200, depending on the details of the specific implementation.

Figure 13:
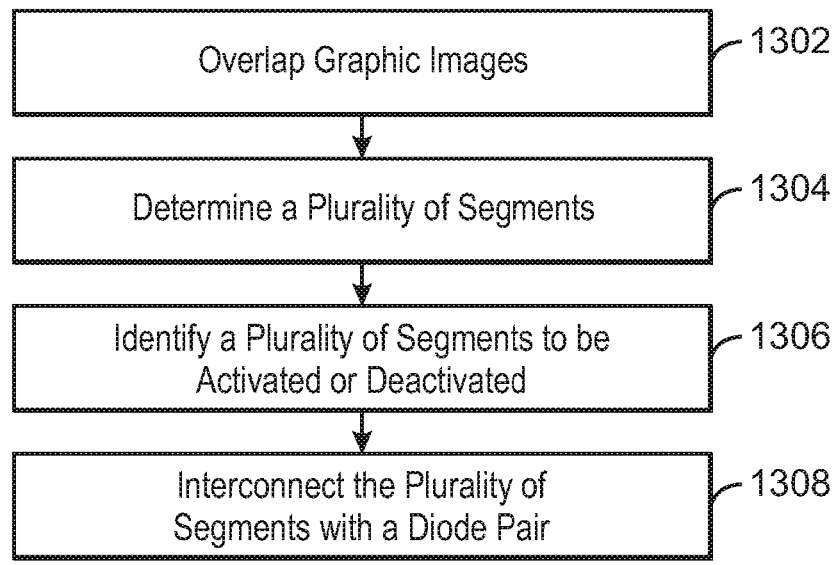
FIG. 13 is a process flow diagram of a method of creating a segmented-based display.

FIG. 13 is a process flow diagram of a method 1300 of creating a segmented-based display. A segmented-based display may show a number of graphic images that may include a number of segments. At block 1302, the graphic images may be overlapped upon one another where only graphic images to be displayed are overlapped. At block, 1304, the number of segments may be determined. The segments may be considered as unique display regions that can be activated independently of each other. At block 1306, the number of segments may be activated or deactivated together. If the segments are activated independently, the segments can be later constructed by driving some all or all of the segments. In some embodiments, the segments may be connected together, e.g., shortened, to reduce the number of drive lines required to drive the segmented based display. The drive lines may be considered as the number of pins on a display connector. At block 1308, the number of segments may be interconnected using a diode pair. The use of the diode pair may remove the requirement of a dedicated drive line for the segments. Since the human eyes cannot visually perceive a gap of diminutive size, e.g., 200 micrometers, the gap may be used for printing the diodes to eventually reduce the number of dedicated drive lines required for the segmented based display.

It is to be understood that the process flow diagram of FIG. 13 is not intended to indicate that the method 1300 is to include all of the components shown in FIG. 13 in every case. Further, any number of additional components can be included within the method 1300, depending on the details of the specific implementation.

Example 1

A segmented-based display is described herein. The segmented-based display may include a front barrier layer, a top plane layer, a display technology specific layer, a back plane layer, and a rear barrier layer.

The front barrier layer and the rear barrier layer may include an environmental barrier solution to protect the display technology specific layer, the top plane layer, and the back plane layer. The display technology specific layer may be disposed between the top plane layer and the back plane layer and may be divided into multiple segments. The top plane layer and the back plane layer may include electrodes, where multiple electrodes can be routed on the back plane layer to form a display connector or a tail. The tail may include a trace layer for each segment and additional trace layers for the top plane layer and the back plane layer. A difference in voltage between the back plane layer and the top plane layer may change the display technology specific material layer. Further, each segment can be activated or deactivated based on the change of the display technology specific layer.

Example 2

A display based keyboard is described herein. The display based keyboard may include a bi-stable segmented-based display, a master controller, and a display driver.

The bi-stable segmented-based display may be based on electrophoretic, electro-chromic, or photonic display technologies. The bi-stable segmented-based display may be a single bi-stable segmented-based display or a multiple bi-stable segmented-based display. The bi-stable segmented-based display may include a fixed-wedge display mode or a no-wedge display mode. The fixed-wedge display mode lifts the bi-stable segmented-based display into an angled position and includes a push lock mechanism to lift the bi-stable segmented-based display. The display based keyboard may include a low-pin count display interface and at least two or more display drivers. The bi-stable segmented-based display may be controlled by the master controller. The display based keyboard may include a number of keys that are non-tactile or tactile, where the number of keys is less than forty keys. The bi-stable segmented-based display may be connected to the display driver using a flex connector.

Example 3

A method of creating segmented-based display is described herein. The method includes overlapping graphic images, determining a plurality of segments, identifying a plurality of segments to be activated or deactivated, and interconnecting the plurality of segments with a diode pair. The interconnecting of the plurality of segments includes interconnecting the segments that are common to multiple graphic images, where each segment that is common to more than one graphic image includes a drive line. The overlapping graphic images may include images to be displayed. Each segment within the plurality of segments is activated or deactivated individually or activated or deactivated simultaneously. The plurality of segments may be connected together to reduce the number of pins on a display connector.

Example 4

A tangible, non-transitory computer-readable medium is described herein. The tangible, non-transitory computer-readable medium includes code to direct a processor to overlap graphic images, determine a plurality of segments, identify a plurality of segments to be activated or deactivated, and connect the plurality of segments with a diode pair.

The interconnecting of the plurality of segments includes interconnecting the segments that are common to multiple graphic images, where each segment that is common to more than one graphic image includes a drive line. The overlapping graphic images may include images to be displayed. Each segment within the plurality of segments is activated or deactivated individually or activated or deactivated simultaneously. The plurality of segments may be connected together to reduce the number of pins on a display connector.

Example 5

A method of creating a segmented-based display is described herein. The method of creating a segmented-based display includes means for overlapping graphic images, means determining a plurality of segments, means identifying a plurality of segments to be activated or deactivated, and means interconnecting the plurality of segments with a diode pair.

The interconnecting of the plurality of segments includes interconnecting the segments that are common to multiple graphic images, where each segment that is common to more than one graphic image includes a drive line. The overlapping graphic images may include images to be displayed. Each segment within the plurality of segments is activated or deactivated individually or activated or deactivated simultaneously. The plurality of segments may be connected together to reduce the number of pins on a display connector.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different, thus, which one that is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A segmented display for an off-screen keyboard, the segmented display comprising:
   a top plane layer comprising an electrode;
   a layer comprising a bi-stable material; and
   a back plane layer comprising a plurality of electrodes, each electrode of the plurality of electrodes forming a segment of the segmented display, wherein the segment comprises a part of a character on the off-screen keyboard in response to the segment being activated by a change in the bi-stable material, the change in the bi-stable material to be caused by a difference between a voltage of the electrode on the back plane layer corresponding to the segment and a voltage of the electrode comprising the top plane layer;
   wherein the segmented display consumes a maximum of 12 microwatts per square centimeter during an image change.

2. The segmented display for an off-screen keyboard of claim 1, wherein the segmented display is a non-pixelated segmented display.

3. The segmented display for an off-screen keyboard of claim 1, wherein a front barrier layer and a rear barrier layer comprise an environmental barrier solution to protect the layer comprising the bi-stable material, the top plane layer, and the back plane layer.

4. The segmented display for an off-screen keyboard of claim 1, wherein the layer comprising the bi-stable material is disposed between the top plane layer and the back plane layer.

5. The segmented display for an off-screen keyboard of claim 1, wherein the layer comprising the bi-stable material is divided into multiple segments.

6. The segmented display for an off-screen keyboard of claim 1, wherein the plurality of electrodes are routed on the back plane layer to form a display connector or a tail.

7. The segmented display for an off-screen keyboard of claim 6, wherein multiple segments are connected together to reduce a number of pins on the display connector.

8. The segmented display for an off-screen keyboard of claim 1, wherein the bi-stable material forms a glyph on the off-screen keyboard, and wherein the glyph is a visual representation of a character on the off-screen keyboard.

9. The segmented display for an off-screen keyboard of claim 8, wherein a character on the off-screen keyboard corresponds to a plurality of glyphs or a plurality of characters corresponds to one glyph.

10. The segmented display for an off-screen keyboard of claim 1, wherein a fixed wedge lifts the off-screen keyboard into an angled position.

11. The segmented display for an off-screen keyboard of claim 10, wherein the fixed wedge comprises a push lock mechanism to lift the off-screen keyboard.

12. The segmented display for an off-screen keyboard of claim 1, wherein the segmented display consumes zero power when content of the off-screen keyboard is static.

13. The segmented display for an off-screen keyboard of claim 1, wherein the segmented display consumes a maximum of 480 microwatts per square centimeter during an entire key update.

14. The segmented display for an off-screen keyboard of claim 1, wherein the segmented display maintains a pitch in a range of 19-21 millimeters.

15. A method of creating a segmented display for an off-screen keyboard, comprising:
   forming a top plane layer comprising an electrode;
   forming a layer comprising a bi-stable material; and
   forming a back plane layer comprising a plurality of electrodes, each electrode of the plurality of electrodes forming a segment of the segmented display, wherein the segment comprises a part of a character on the off-screen keyboard in response to the segment being activated by a change in the bi-stable material, the change in the bi-stable material to be caused by a difference between a voltage of the electrode on the back plane layer corresponding to the segment and a voltage of the electrode comprising the top plane layer;
   wherein the segmented display consumes a maximum of 12 microwatts per square centimeter during an image change.

16. The method of claim 15, comprising forming an environmental barrier solution comprising a front barrier layer and a rear barrier layer to protect the layer comprising the bi-stable material, the top plane layer, and the back plane layer.

17. The method of claim 15, comprising disposing the layer comprising the bi-stable material between the top plane layer and the back plane layer.

18. The method of claim 15, comprising dividing the layer comprising the bi-stable material into multiple segments.

19. The method of claim 15, comprising routing the plurality of electrodes on the back plane layer to form a display connector or a tail.

20. The method of claim 19, comprising connecting together multiple segments to reduce a number of pins on the display connector.

21. The method of claim 15, comprising forming a glyph on the off-screen keyboard from the bi-stable material, wherein the glyph is a visual representation of a character on the off-screen keyboard.

22. The method of claim 21, wherein a character on the off-screen keyboard corresponds to a plurality of glyphs or a plurality of characters corresponds to one glyph.

23. The method of claim 15, comprising forming a fixed wedge to lift the off-screen keyboard into an angled position.

24. The method of claim 23, wherein the fixed wedge comprises a push lock mechanism to lift the off-screen keyboard.

25. The method of claim 15, wherein the segmented display consumes a maximum of 480 microwatts per square centimeter during an entire key update.

26. The method of claim 15, wherein the segmented display consumes zero power when content of the off-screen keyboard is static.

27. The method of claim 15, wherein the segmented display maintains a pitch in a range of 19-21 millimeters.

28. The method of claim 15, wherein the segmented display is a non-pixelated segmented display.

29. A segmented display for an off-screen keyboard, the segmented display comprising:
   a top plane layer comprising an electrode;
   a layer comprising a bi-stable material; and
   a back plane layer comprising a plurality of electrodes, each electrode of the plurality of electrodes forming a segment of the segmented display, wherein the segment comprises a part of a character on the off-screen keyboard in response to the segment being activated by a change in the bi-stable material, the change in the bi-stable material to be caused by a difference between a voltage of the electrode on the back plane layer corresponding to the segment and a voltage of the electrode comprising the top plane layer;

wherein the segmented display consumes a maximum of 480 microwatts per square centimeter during an entire key update.

30. The segmented display for an off-screen keyboard of claim 29, wherein the segmented display maintains a pitch in a range of 19-21 millimeters.

31. The segmented display for an off-screen keyboard of claim 29, wherein the segmented display is a non-pixelated segmented display.

32. The segmented display for an off-screen keyboard of claim 29, wherein a front barrier layer and a rear barrier layer comprise an environmental barrier solution to protect the layer comprising the bi-stable material, the top plane layer, and the back plane layer.

33. The segmented display for an off-screen keyboard of claim 29, wherein the layer comprising the bi-stable material is disposed between the top plane layer and the back plane layer.

34. The segmented display for an off-screen keyboard of claim 29, wherein the layer comprising the bi-stable material is divided into multiple segments.

35. The segmented display for an off-screen keyboard of claim 29, wherein the plurality of electrodes are routed on the back plane layer to form a display connector or a tail.

36. The segmented display for an off-screen keyboard of claim 29, wherein the bi-stable material forms a glyph on the off-screen keyboard, and wherein the glyph is a visual representation of a character on the off-screen keyboard.

37. The segmented display for an off-screen keyboard of claim 29, wherein a fixed wedge lifts the off-screen keyboard into an angled position.

38. The segmented display for an off-screen keyboard of claim 29, wherein the segmented display consumes zero power when content of the off-screen keyboard is static.

39. A segmented display for an off-screen keyboard, the segmented display comprising:
a top plane layer comprising an electrode;
a layer comprising a bi-stable material; and
a back plane layer comprising a plurality of electrodes, each electrode of the plurality of electrodes forming a segment of the segmented display, wherein the segment comprises a part of a character on the off-screen keyboard in response to the segment being activated by a change in the bi-stable material, the change in the bi-stable material to be caused by a difference between a voltage of the electrode on the back plane layer corresponding to the segment and a voltage of the electrode comprising the top plane layer;
wherein the segmented display maintains a pitch in a range of 19-21 millimeters.

40. The segmented display for an off-screen keyboard of claim 39, wherein the segmented display consumes a maximum of 12 microwatts per square centimeter during an image change, and wherein the segmented display consumes a maximum of 480 microwatts per square centimeter during an entire key update.

41. The segmented display for an off-screen keyboard of claim 39, wherein the segmented display is a non-pixelated segmented display.

42. The segmented display for an off-screen keyboard of claim 39, wherein a front barrier layer and a rear barrier layer comprise an environmental barrier solution to protect the layer comprising the bi-stable material, the top plane layer, and the back plane layer.

43. The segmented display for an off-screen keyboard of claim 39, wherein the layer comprising the bi-stable material is disposed between the top plane layer and the back plane layer.

44. The segmented display for an off-screen keyboard of claim 39, wherein the layer comprising the bi-stable material is divided into multiple segments.

45. The segmented display for an off-screen keyboard of claim 39, wherein the plurality of electrodes are routed on the back plane layer to form a display connector or a tail.

46. The segmented display for an off-screen keyboard of claim 39, wherein the bi-stable material forms a glyph on the off-screen keyboard, and wherein the glyph is a visual representation of a character on the off-screen keyboard.

47. The segmented display for an off-screen keyboard of claim 39, wherein a fixed wedge lifts the off-screen keyboard into an angled position.

48. The segmented display for an off-screen keyboard of claim 39, wherein the segmented display consumes zero power when content of the off-screen keyboard is static.

49. A method of creating a segmented display for an off-screen keyboard, comprising:
forming a top plane layer comprising an electrode;
forming a layer comprising a bi-stable material; and
forming a back plane layer comprising a plurality of electrodes, each electrode of the plurality of electrodes forming a segment of the segmented display, wherein the segment comprises a part of a character on the off-screen keyboard in response to the segment being activated by a change in the bi-stable material, the change in the bi-stable material to be caused by a difference between a voltage of the electrode on the back plane layer corresponding to the segment and a voltage of the electrode comprising the top plane layer;
wherein the segmented display consumes a maximum of 480 microwatts per square centimeter during an entire key update.

50. The method of claim 49, wherein the segmented display is a non-pixelated segmented display.

51. The method of claim 49, comprising forming an environmental barrier solution comprising a front barrier layer and a rear barrier layer to protect the layer comprising the bi-stable material, the top plane layer, and the back plane layer.

52. The method of claim 49, comprising disposing the layer comprising the bi-stable material between the top plane layer and the back plane layer.

53. The method of claim 49, comprising dividing the layer comprising the bi-stable material into multiple segments.

54. The method of claim 49, comprising routing the plurality of electrodes on the back plane layer to form a display connector or a tail.

55. The method of claim 49, comprising forming a glyph on the off-screen keyboard from the bi-stable material, wherein the glyph is a visual representation of a character on the off-screen keyboard.

56. The method of claim 49, comprising forming a fixed wedge to lift the off-screen keyboard into an angled position.

57. The method of claim 49, wherein the segmented display consumes zero power when content of the off-screen keyboard is static.

58. The method of claim 49, wherein the segmented display maintains a pitch in a range of 19-21 millimeters.

59. A method of creating a segmented display for an off-screen keyboard, comprising:
forming a top plane layer comprising an electrode;
forming a layer comprising a bi-stable material; and forming a back plane layer comprising a plurality of electrodes, each electrode of the plurality of electrodes forming a segment of the segmented display, wherein the segment comprises a part of a character on the off-screen keyboard in response to the segment being activated by a change in the bi-stable material, the change in the bi-stable material to be caused by a difference between a voltage of the electrode on the back plane layer corresponding to the segment and a voltage of the electrode comprising the top plane layer;

wherein the segmented display maintains a pitch in a range of 19-21 millimeters.

60. The method of claim 59, wherein the segmented display is a non-pixelated segmented display.

61. The method of claim 59, comprising forming an environmental barrier solution comprising a front barrier layer and a rear barrier layer to protect the layer comprising the bi-stable material, the top plane layer, and the back plane layer.

62. The method of claim 59, comprising disposing the layer comprising the bi-stable material between the top plane layer and the back plane layer.

63. The method of claim 59, comprising dividing the layer comprising the bi-stable material into multiple segments.

64. The method of claim 59, comprising routing the plurality of electrodes on the back plane layer to form a display connector or a tail.

65. The method of claim 59, comprising forming a glyph on the off-screen keyboard from the bi-stable material, wherein the glyph is a visual representation of a character on the off-screen keyboard.

66. The method of claim 59, wherein the segmented display consumes zero power when content of the off-screen keyboard is static.

67. The method of claim 59, wherein the segmented display consumes a maximum of 12 microwatts per square centimeter during an image change, and wherein the segmented display consumes a maximum of 480 microwatts per square centimeter during an entire key update.

* * * * *